United States Patent [19]

Servanton et al.

[11] 4,223,769

[45] Sep. 23, 1980

[54] DEVICE FOR BRAKING A VEHICLE WHEEL

[75] Inventors: Georges Servanton, L'Etrat; Michel C. Garnier, Brunoy, both of France

[73] Assignee: S.O.M.A.-Europe Transmissions Societe Nouvelle Mecanique et Automobile, Saint Etienne, France

[21] Appl. No.: 953,102

[22] Filed: Oct. 20, 1978

[30] Foreign Application Priority Data

Nov. 7, 1977 [FR] France ............... 77 33467

[51] Int. Cl.³ .................. F16D 55/26; B60K 41/26
[52] U.S. Cl. ............................... 192/4 A; 188/72.6
[58] Field of Search ............ 192/4 A, 4 R; 74/391; 188/72.6

[56] References Cited

U.S. PATENT DOCUMENTS

| 4,010,830 | 3/1977 | Logus et al. ............... 192/4 A |
| 4,037,694 | 7/1977 | Keese .......................... 192/4 A |
| 4,114,479 | 9/1978 | Ashfield ..................... 192/4 A X |
| 4,142,615 | 3/1979 | Sides, Jr. et al. ............ 192/4 A |
| 4,160,497 | 7/1979 | Galicher ....................... 192/4 A |

Primary Examiner—C. J. Husar
Assistant Examiner—Conrad Berman
Attorney, Agent, or Firm—Oblon, Fisher, Spivak, McClelland & Maier

[57] ABSTRACT

This device, which is intended to brake a wheel of a vehicle rotated by a drive shaft carrying at its free end an epicyclic train reducer housed in a casing, is characterized in that it is fixed on the outer face of the bottom of the casing and comprises a watertight case enclosing at least one friction disc interlocked in rotation with the sun wheel of the reducer, as well as an annular plate for moving the disc axially and applying it against at least one internal friction surface, this plate being itself axially movable towards the disc under the action of control means situated inside the casing.

6 Claims, 1 Drawing Figure

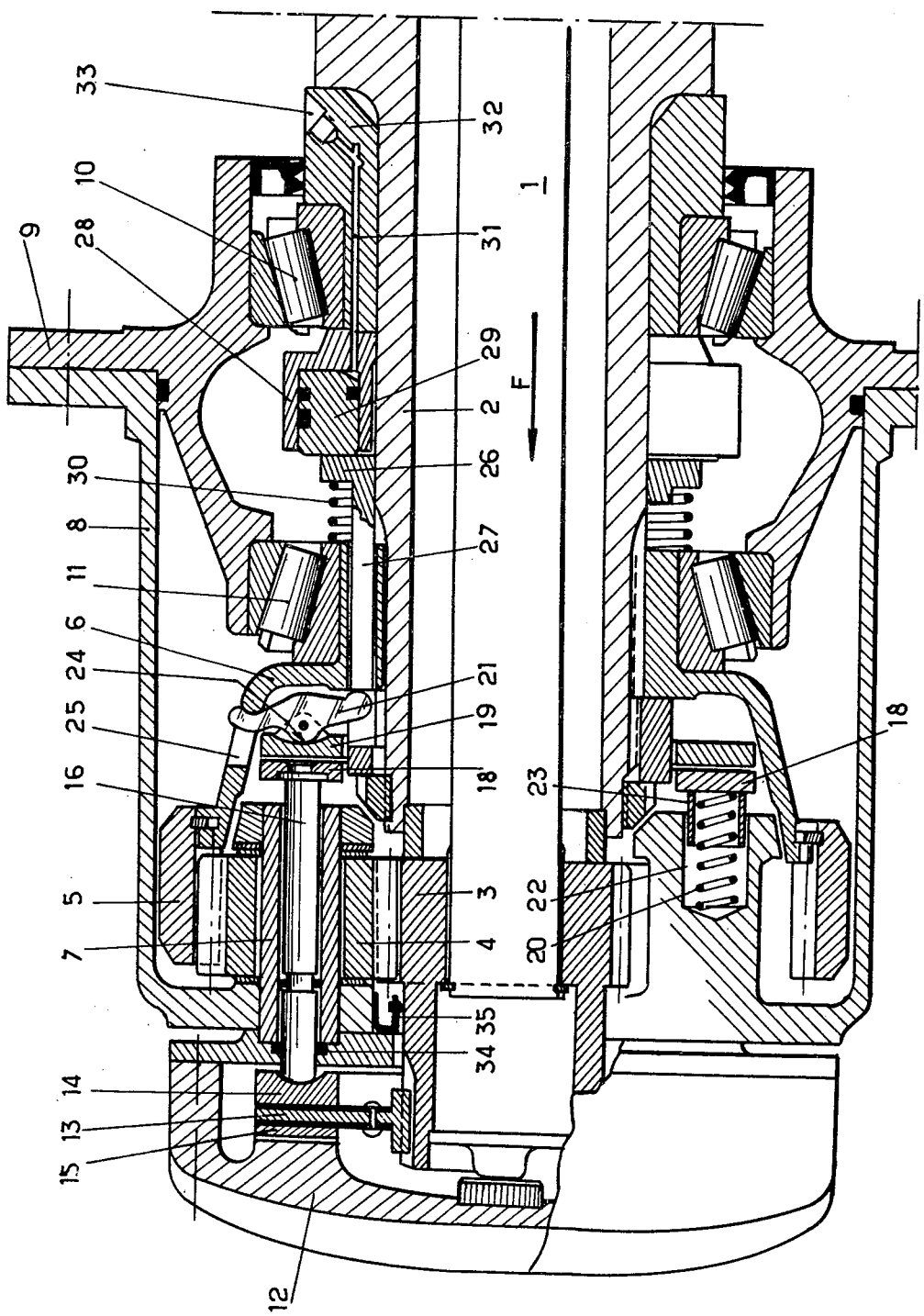

DEVICE FOR BRAKING A VEHICLE WHEEL

The present invention relates to a device for braking a vehicle wheel whose hub is rotatably mounted on a stub axle of a rear axle of the vehicle and which is rotated by means of a drive shaft which emerges at the free end of the stub axle and on which is fixed the sun wheel of an epicyclic train reducer whose planet wheels cooperate with a ring gear integral with a ring gear carrier fixed on the stub axle, the planet wheels being mounted on shafts carried by the bottom of a casing integral with the hub and enclosing the reducer.

In vehicles, such as work trucks or earth-moving equipment, which comprise double reduction rear axle mechanisms with epicyclic sun-and-planet gears, access to the braking devices is difficult so that it is necessary at the present time to remove the wheels and sometimes even the reducer to service them or repair them.

These braking devices are furthermore subject to rapid clogging up and wear, which leads to frequent stoppages of the vehicles which cannot therefore be used to the maximum of their possibilities.

The present invention proposes removing these disadvantages and, for this, it has as its subject a braking device which is characterized in that it is fixed on the outer face of the bottom of the casing and comprises a watertight case enclosing at least one friction disc interlocked in rotation with the sun gear, as well as an annular plate for moving the disc axially and applying it against at least one internal friction surface, this plate being itself movable axially towards the disc under the action of control means situated inside the casing.

The active part of the braking device is now transferred to the outside of the wheels, which makes it easily accessible and so avoids the dismantling which has been necessary up to now for servicing. Moreover, owing to the watertight case which encloses it, it is protected from outside agents and is therefore perfectly protected against the risks of clogging up.

According to one preferred embodiment of the invention, the control menas comprise push-rods housed in the shafts carrying the planet wheels, these rods bearing on the annular plate at one of their ends and being connected at their other end by a ring disposed inside the ring gear carrier, a non-rotatable counter-plate capable of being applied against the ring to push it, against resilient return members, towards the friction disc, rocking levers for moving the counter-plate and means for actuating the rocking levers.

With this arrangement, the braking device may have a compact structure and be perfectly integrated with the reducer of the rear axle mechanism.

It should moreover be noted that the counter-plate, while bearing against the ring, exerts a braking force adding to that resulting from the bringing into contact of the disc and the friction surface inside the case.

Preferably, the resilient return members are formed by springs each bearing against the bottom of a cavity formed in the inner face of the bottom of the casing and against the ring which is provided with sleeves surrounding the springs, these sleeves being slidably mounted in the cavities.

It will be noted here that the guide sleeves cooperate with the push-rods to drive the ring and thus contribute to this latter rotating in perfect synchronism with the planet wheel carrier casing.

According to a particularly simple embodiment, the rocking levers are pivotably mounted on lugs of the counter-plate against which they rest through a cam surface and bear with one of their ends against the wall of an aperture formed in the ring gear carrier.

As for the means for actuating them, they comprise an annular plate slidably mounted on the stub axle and carry push-rods whose free ends each bear on a lever, as well as an annular hydraulic cylinder fixed on the stub axle and whose piston bears on the plate against the action of a resilient return member.

Advantageously, the push-rods of the annular plate extend into bores formed in the ring gear holder. Owing to this arrangement, the push-rods are perfectly guided and well protected. As for the braking device and its control means, they may be constructed with a structure as compact as possible.

According to a particular feature of the invention, the piston of the hydraulic cylinder is controlled by a hydraulic fluid arriving in the cylinder through a channel formed in a sleeve carrying a bearing by means of which the hub of the wheel is rotatably mounted on the stub axle.

One embodiment of the present invention is shown by way of example in the accompanying drawing in which the single FIGURE is a partially sectional view of the braking device.

The device, according to the invention, is for braking a wheel of a vehicle comprising a double reduction rear axle with epicyclic sun-and-planet gears. This mechanism which is partially shown in the drawing comprises, among other things, a drive shaft 1 housed in a stub axle 2 and a conventional reducer comprising a sun wheel 3 fixed on the free end of the drive shaft and planet wheels 4 (one of which is visible) cooperating with a ring gear 5 fixed on a ring gear carrier 6 fixed on the stub axle. The planet wheels are mounted on shafts 7 carried by the bottom of a casing 8 interlocked in rotation with the hub 9 of the wheel, the hub being rotatably mounted on the stub axle by means of two bearings 10, 11, respectively.

In accordance with the invention, the braking device is fixed on the outer face of the bottom of the casing and is thus transferred to the outside of the wheel. It comprises a watertight case 12 enclosing a friction disc 13 interlocked in rotation with sun wheel 3, and an annular plate 14 provided for moving the disc axially and applying it against an internal friction surface 15, this plate being itself axially movable, towards the disc, under the action of control means disposed in the casing.

It goes without saying of course that case 12 could contain several discs inserted between internal friction surfaces, and not simply a single disc as shown for the sake of clearness in the drawing.

The control means for plate 14 comprise push-rods 16 housed in the shafts 7 of the planet wheels. These rods bear on plate 14 at one of their ends and are riveted at their other end to a ring 18 housed in the ring gear carrier.

The control means comprise furthermore a counter-plate 19 located behind ring 18 and capable of being applied against this latter so as to push it against the action exerted by return springs 20, rocking levers 21 (only one of which is shown) provided for moving the counter-plate, and means for actuating the rocking levers.

It will be noted here that each of the springs 20 bears against the bottom of a cavity 22 formed in the inner face of the bottom of casing 8 and against ring 18 which is provided with sleeves 23 slidably mounted in cavities 22.

The rocking levers 21 are pivotably mounted on lugs of the counter-plate 19 against which they rest through a cam surface 24 and each bear with one of their ends against the wall of an aperture 25 formed in the ring gear carrier.

Of course, the number of rocking levers is not necessarily equal to that of the planet wheels. It could in fact be equal to 3 for reasons of stability.

The means for actuating the rocking levers comprise for their part an annular plate 26 slidably mounted on the stub axle, this plate carrying push-rods 27 whose free ends each bear on the end of a lever which is not that bearing in an aperture 25, as well as an annular hydraulic cylinder 28 fixed on the stub axle and whose piston 29 acts against the action of a return spring 30 to move plate 26 towards the rocking levers.

As can be seen in the drawing, rods 27 extend into bores formed in the rear end of the ring gear carrier on which bearing 11 rests, whereas piston 29 moves under the pressure of a hydraulic fluid fed into cylinder 28 by a channel 31 formed in a sleeve 32 carrying bearing 10.

In the example shown, the fluid feed is provided from an orifice 33 formed in the rear part of sleeve 32 whereas the drain takes place through a channel (not visible) located at the high point of cylinder 28.

For completeness, it will be noted that the braking device comprises two seals 34 and 35 enabling its active part located in case 12 to operate in dry conditions. It goes without saying however that the two seals could be omitted so that the active part may operate in the oil of the reducer.

The braking device according to the invention operates in the following manner:

When the driver of the vehicle actuates the brake pedal, the hydraulic fluid passes through channel 31 and into cylinder 28 where it pushes piston 29 against plate 26. This latter then moves in the direction of arrow F whereas its push-rods 27 cause rocking levers 21 to pivot about their fulcrum in apertures 25 of the ring gear carrier. Meanwhile, levers 21, through their cam surface 24, apply counter-plate 19 against ring 18 which pushes the rods 16 in the direction of arrow F. The annular plate 14 then comes against disc 13 which is finally applied against friction surface 15.

The wheel of the vehicle is therefore now braked, the braking reaction being taken up by the ring gear 6 which transmits it to the stub axle through the ring gear carrier.

It will be noted here that the total braking torque results also from the braking action exerted between ring 18 and counter-plate 19.

What is claimed is:

1. A device for braking a vehicle wheel whose hub is rotatably mounted on a stub axle of a rear axle of the vehicle and which is rotated through a drive shaft emerging at the free end of the stub axle, and on which is fixed the sun wheel of an epicyclic train reducer whose planet wheels, engaged with a ring gear integral with a ring gear carrier fixed on the stub axle, are mounted on shafts carried by the bottom of a casing integral with the hub and enclosing the reducer, this device being fixed on the outer face of the bottom of the casing and comprising a watertight case enclosing at least one friction disc interlocked in rotation with the drive shaft, as well as an annular plate axially movable under the action of control means for applying it against the disc, characterized in that the control means comprise push-rods housed in the shafts carrying the planet wheels, these rods bearing on the annular plate with one of their ends and being connected at their other end by a ring disposed inside the ring gear carrier, a non-rotatable counter-plate adapted to be applied against the ring for pushing it, against resilient return members, towards the friction disc, rocking levers for moving the counter-plate and means for actuating the rocking levers.

2. A device according to claim 1, characterized in that the resilient return members are formed by springs each bearing against the bottom of a cavity formed in the inner face of the bottom of the casing and against the ring which is provided with sleeves surrounding the springs, these sleeves being slidably mounted in the cavities.

3. A device according to claim 1, characterized in that the rocking levers are pivotably mounted on lugs on the counter-plate against which they rest through a cam surface and bear with one of their ends against the wall of an aperture formed in the ring gear carrier.

4. A device according to claim 1, characterized in that the means for actuating the rocking levers comprise an annular plate slidably mounted on the stub axle and carrying push-rods whose free ends each bear on a lever, as well as an annular hydraulic cylinder fixed on the stub axle and whose piston bears on the plate against the action of a resilient return member.

5. A device according to claim 4, characterized in that the push-rods of the annular plate extend into bores formed in the ring gear carrier.

6. A device according to claim 4, characterized in that the piston of the hydraulic cylinder is controlled by a hydraulic fluid fed into the cylinder through a channel formed in a sleeve carrying a bearing through which the hub of the wheel is rotatably mounted on the stub axle.

* * * * *